PROCESS FOR CATHODICALLY SPUTTERING A FERROMAGNETIC
THIN FILM OF A NICKEL-IRON-MOLYBDENUM ALLOY
Filed Dec. 23, 1964 3 Sheets-Sheet 1

INVENTOR
BARRY L. FLUR

BY
Bertram M. Mullin
ATTORNEY 3,303,117

PROCESS FOR CATHODICALLY SPUTTERING A FERROMAGNETIC THIN FILM OF A NICKEL-IRON-MOLYBDENUM ALLOY

Barry L. Flur, Poughkeepsie, N.Y., assignor to International Business Machines Corporation, New York, N.Y., a corporation of New York Filed Dec. 23, 1964, Ser. No. 420,754
3 Claims. (Cl. 204—192)

This invention relates to ferromagnetic thin films of the type finding adaptation as storage and switching devices in computers; and, in particular, to ferromagnetic thin films of nickel-iron-molybdenum, to the process for producing the ferromagnetic film, and to the products produced therefrom.

A concerted effort is presently underway, by both the scientific and academic community, to study and to develop ferromagnetic thin films for adaptation as parametrons, delay lines, logic devices and storage elements for computers. What has given impetus to this effort is the discovery by M. J. Blois, Jr., in 1955, that ferromagnetic thin films of 80:20 (by weight) nickel-iron, when evaporated in the presence of a magnetic field, exhibit uniaxial anisotropy. With uniaxial anisotropy, an easy axis of magnetization is furnished which is parallel to the direction of the externally applied field, along which are found two stable states corresponding to positive and negative remanence. Also, these ferromagnetic thin films tend to favor a domain structure that allows rapid rotation of the magnetic remanence from one stable state to the other. Potentially, both engineering and economical advantages are offered over present storage and switching devices used in data processing and computer machines.

Storage or switching of intelligence is achieved by magnetizing a particular element or "bit," in an array of such elements, into either one or the other of its stable states. Rotation of the magnetization remanence takes place, upon application of the required switching fields, from one stable state to the other, in short periods of time, in the order of nanoseconds ($10^{-9}$). Characteristics such as these lend themselves to the applications as heretofore described.

Various techniques are available for preparing ferromagnetic thin film devices that exhibit uniaxial anisotropy. These include: vacuum deposition, electroplating, chemical reduction, pyrolytic methods, and cathode sputtering. The first two of these methods have received wide attention in the literature. Chemical reduction or electroless plating involves the reduction of metal salts such as those of nickel, iron, and cobalt, with hypophosphite on an active or catalytic surface. The pyrolytic method, a process which has not attracted the interest such as that focused on the others, entails thermally decomposing an appropriate metal-organic compound, such as the mixtures of the nickel and iron carbonyls.

Now, as to the last of these processes, cathode sputtering is a process in which atoms are ejected from the surface of a material through the impact of ions or of atoms. Commonly, the procedure for causing ions to strike a material and eject atoms, employs an enclosed chamber, maintained at a pressure from about $10^{-1}$ to about $10^{-2}$ torr or higher, in which are mounted two plates in parallel-spaced relation. A D.C. source is coupled to the plates to furnish a potential of several thousand volts. The material that is sputtered or is mounted on one plate, that is, the medium giving up its atoms, is generally designated the target, and the substrate, the surface upon which the ejected atoms are collected, is positioned on the other plate. The potential applied between the plates produces positive ions in the glow discharge between the plates, and the positive ions are accelerated toward the target, ejecting atoms or molecules therefrom. Since almost the entire applied voltage in a glow discharge is dropped across the ion sheath that surrounds the target, the target is under steady bombardment by high-energy ions, the impact of which impels atoms of the target material to leave its surface, which atoms flow toward the substrate surface upon which the film is formed.

Although success has been achieved with some of these heretofore mentioned techniques, the implementation of a thin film ferromagnetic device, where the film is a produce of a cathode sputtering process and yielding the magnetic characteristics and economic advantages that theory affords, was a substantial problem until the advent of the process which is the subject of copending patent application of Leon I. Maissel et al., Serial No. 402,800, filed October 9, 1964, which patent application is assigned to the assignee of the instant application.

That process of Leon I. Maissel et al. provides reproducible magnetic alloy thin films from the plasma environment of a glow discharge process. That process enables control over structure and composition that was heretofore not available from prior art processes, thereby furnishing magnetic properties such that a range of the same may be predictably built into the film. That process utilizes thin foils or sheets of ferromagnetic material which are subjected to ionic bombardment and the products of the bombardment collected on a substrate while the condensing atoms or molecules are subjected to a suitable bias. Thus a cathode sputtering process is provided for producing ferromagnetic thin films which is both economically and scientifically competitive with magnetic thin films produced by other processes.

It appears desirable that a ferromagnetic thin film, prepared for computer utilization, have low anisotropy fields, to permit rapid switching at lower drive currents and, further, as based on experimental and analytical studies, have a low dispersion of the easy axis to provide disturb-insensitive films. It is in the anticipation of obtaining such films that the industry has focused its attention on the Permalloy type film. That film, Permalloy, normally contains from 55% to 85% nickel with the balance iron and, in bulk, exhibits high permeability, low coercive force, low magnetostriction, and low anisotropy. But, although the magnetostriction and anisotropy are sufficiently low for some computer functions, investigators in the art have found that the zero magnetostriction alloy (81:19 nickel-iron) is not the same composition that exhibits the lowest anisotropy (78:22 nickel-iron) it appears that the crystalline anisotropy is an important contributor to the dispersion of the easy axis and, in some instances, may contribute to the total anisotropy as well. As a result of the increased stress now being placed on computers capable of operating at higher speeds, the relatively high crystalline anisotropy of the Permalloy type film has caused attention to be directed to other ferromagnetic film materials which, from their properties in bulk, appear to be more suitable for computer use.

Why anisotropy and magnetostriction are important parameters, for evaluating the suitability of a ferromagnetic thin film material for computer applications, is readily gained from the discussions in the literature. But, a brief review of the import of these phenomenon may lend to the appreciation of the present contribution. Of course, it is to be realized that many of the fundamentals and details of the discussion that is to follow are, by necessity, greatly simplified. Ferromagnetism, it is generally accepted, is directly related to the spin of the electrons in material. One may think of each electron behaving very much like a bar magnet which, in a magnetic field, can align itself either with the field or against it according to its spin. To magnetize a material, more of its electrons must spin one way than the other so that an excess of elementary magnets point in one direction. The regions in the material in which electron spins are parallel are designated domains, and these domains are representative of the lowest energy configuration for the assembly of elementary magnets. When an external magnetic field is applied, the magnetic energy of domains oriented in the direction of the field is lowered the magnetic energy of the domains oriented against the field is raised.

Two important parameters related to the magnetic state of material are crystalline anisotropy and magnetostriction. Although both of these phenomena are not totally divorced one from the other, the discussion that is presented hereafter shall treat these phenomena, for purposes of clarity and ease of understanding, as independent one from the other.

The crystalline anisotropy energy, or, as is sometimes called, the magnetocrystalline energy, of a ferromagnetic crystal acts in such a way that the magnetization tends to be directed along certain definite crystallographic axes which, accordingly, are called directions of easy magnetization. The directions along which it is most difficult to magnetize the material are called the hard directions. It is the availability of well defined easy and hard directions that has attracted the attention to ferromagnetic thin films, the anisotropy provides the bistate behavior which is sought, in the film. But, as heretofore mentioned, the crystalline anisotropy is an important contributor to the dispersion of the easy axis, as well as, possibly, contributing to the anisotropy energy as a whole. High values of crystalline anisotropy lead to increased power requirement, specifically, in the word drivers.

Also, influencing the total anisotropy of the material is magnetoelastic energy which is that part of the energy which arises from the interaction between the magnetization and the mechanical strain of the material. It is known from theoretical and experimental considerations that there is a close physical relationship which exists between crystalline anisotropy and the magnetostriction phenomena in a mangetic material. Thus it is readily appreciated that it is most advantageous, in order to achieve higher speeds of operation, in a computer, to provide ferromagnetic thin films which exhibit low anisotropy fields as well as a minimum of magnetostriction effects.

Ternary ferromagnetic films of nickel-iron-molybdenum appear, from their properties in bulk, to offer these desirable features. From experience with bulk alloys of nickel-iron-molybdenum, particularly 79-nickel, 17-iron, 4-molybdenum, it was expected that essentially zero magnetostriction and low anisotropy fields would be exhibited by thin films of that composition, since bulk material in thicknesses roll to ⅛ mil thick foil and appropriately heat treated exhibit square hysteresis loops along with the other sought magnetic properties. Although theory and experience would indicate that ternary alloys of nickel-iron-molybdenum should provide ferromagntic film materials that exhibit low magnetostriction and low crystalline anisotropy in conjunction with other desired properties for computer applications, the realization of the ternary ferromagnetic thin film of this composition is still wanting.

Now, further improvements to the heretofore mentioned Maissel et al. process have been discovered that now makes it possible to provide a ternary ferromagnetic film of nickel-iron-molybdenum that exhibits the desired characteristics sought for computer applications. What has been found is that the cathodic sputtering of a ternary ferromagnetic thin film of the nickel-iron-molybdenum composition yields a ferromagnetic thin film with crystalline anisotropy energies lower than that presently available with the Permalloy type films. The ternary ferromagnetic thin film of nickel-iron-molybdenum, which is a product of the cathode sputtering process, now makes it possible to decrease the power requirements for operating computers, thereby increasing the speed of operation with nearly perfect reliability.

Prior to the preparation of the present ferromagnetic thin film of nickel-iron-molybdenum with the desirable properties, various procedures have been attempted to accomplish the same. For example, others have employed cathode sputtering for producing the ternary ferromagnetic thin film of nickel-iron-molybdenum, but, in those instances where cathode sputtering was used to sputter that alloy, the sputtering was done at low pressures, which requires the use of an externally supported (hot filament) glow discharge to enable the sputtering to take place. Such a process and the product resulting therefrom has many shortcomings and deficiencies compared to a self sustained glow discharge sputtering process and product, such as that which is the subject of the present invention. A low pressure cathode sputtering process and product as described in the prior art are not commercially nor scientifically competitive with a self sustained glow sputtering process for producing ferromagnetic thin films.

Sputtering in a self sustained glow discharge begins to fall off at pressures below about 20 microns because of the rapid decrease in the density of the ions with decreasing pressure, but the increased energy of the ions at low pressures and the longer mean free path of the sputtered atoms do not compensate for the reduced ion density. To enable sputtering at reasonable rates at low pressure, the supply of ionizing electrons or ions must be increased or the ionization deficiency of the available electrons greatly improved. Although this can be done to some extent, it complicates the sputtering process, particularly the very severe problem of obtaining uniform deposits over large areas. A process that requires elaborate procedures for operations such as the low pressure sputtering process and yet does not yield uniform deposits is neither commercially nor scientifically competitive with ferromagnetic thin films presently available from the heretofore mentioned prior art processes.

Of more recent date, attempts have been made to form ferromagnetic thin films of nickel-iron-molybdenum by other techniques in order to take advantage of the properties afforded by theory. Variable ratio sequential and simultaneous two-source evaporation has been employed, but the magnetic characteristics reported for these evaporated nickel-iron-molybdenum ferromagnetic thin films are not sufficiently attractive to warrant their implementation for computer application.

While investigations have been carried on for ways of preparing nickel-iron-molybdenum films and cathode sputtering pocedures have been utilized in this endeavor, no one has provided a ferromagnetic thin film of nickel-iron-molybdenum that is sufficiently attractive to capture the attention of the computer industry. Nor has anyone proposed a general approach for preparing such films, which approach promises nickel-iron-molybdenum ferromagnetic thin films with the desired properties and which ferromagnetic thin films is also producible at commercially accepted yields. Consequently, a desirable replacement for the conventional nickel-iron films of the Blois type have not been realized, nor has the inviting advantages, inherent to cathode sputtering, been exploited.

The present invention is based on a discovery that a nickel-iron-molybdenum ferromagnetic thin film is available that exhibits low anisotropy, low coercive force, and desirable values of dispersion, which ferromagnetic thin film is adaptable for computer applications. This is achieved with a cathode sputtering process in which the deleterious attributes and disadvantages of the heretofore described prior art attempts have been eliminated. In obtaining the film, a target which is a thin foil sheet of the ferromagnetic material, that is, an alloy of nickel, iron and molybdenum, is subjected to ionic bombardment in a cathode sputtering system. The atoms of target material ejected by the impact of the ions are collected on a substrate, on the surface of which temperature gradients are minimized and an essentially uniform profile of the same provided. The ejected atoms, while condensing on the substrate, are subjected to a suitable bias. The resulting ferromagnetic films of nickel-iron-molybdenum exhibit uniform properties on the surface thereof and coercive forces, anisotropy fields, and magnetostrictive characteristics which are sufficiently attractive for computer applications.

The presence of these attractive magnetic properties indicates that impurity contamination is avoided or has been reduced to levels that are not detrimental to the film properties. In addition, selectively induced directions of magnetization are well defined indicating that field distortion does not take place or is not of sufficient magnitude to influence the anisotropy. Further, in accordance with the present invention, the tendency to trap and retain large amounts of impurities during deposition, a problem usually encountered in vacuum deposition procedures, is avoided. That problem is usually rather severe for sputtering in comparison to other deposition procedures, because of the bombardment of fixtures and inner surfaces of the vacuum chamber by high-energy ions of the sputtering gas, which produces reactive gases, not easily detected and, further, because ionized species present during the sputtering are generally more reactive than their neutral counterparts. The selective application of a negative bias (relative to the anode) to the film, forming from the ejected atoms on the surface, yields the long sought ferromagnetic thin film of nickel-iron-molybdenum.

Accordingly, it is a principal object of the invention to provide a ferromagnetic thin film of nickel-iron-molybdenum exhibiting magnetic characteristics desirable for implementation for computer applications.

It is a further object of this invention to provide an improved process for cathodically sputtering ferromagnetic thin films containing nickel-iron-molybdenum.

It is yet another object of this invention to provide an improved process for cathodically sputtering ferromagnetic thin films of nickel-iron-molybdenum, which films exhibit uniformity of magnetic properties.

It is yet another object of this invention to provide an economically and commercially feasible process for cathodically sputtering ferromagnetic thin films of nickel-iron-molybdenum for adaptation in data processing and computer machines.

The foregoing and other objects, features and advantages of the invention will be apparent from the following more particular description of preferred embodiments of the invention as illustrated in the accompanying drawings.

Before turning to a more specific discussion of the present invention, several magnetic parameters are briefly reviewed. In particular coercive force $H_o$, anisotropy field $H_{ko}$ and dispersion $\beta$ are of significance in evaluating the anisotropy properties of ferromagnetic thin films and their function in computers. These terms are well known in the art and are widely described in the literature, such as, for example in the article by H. J. Kump, "The Anisotropy Fields in Angular Dispersion of Permalloy Films" 1963, Proceedings of the International Conference on Non-Linear Magnetics, article 12–5. But, to facilitate the discussion at hand, the terminology is briefly reviewed:

$H_o$: coercive force is a measure of the easy direction field necessary to start a domain wall in motion, a threshold for wall motion switching.

$H_{ko}$: anisotropy field may be thought of as the force required to rotate the magnetization from its preferred direction of magnetization to the hard direction and, $H_{ko}$ is the anisotropy field as viewed on a microscopic scale.

Figure 4:
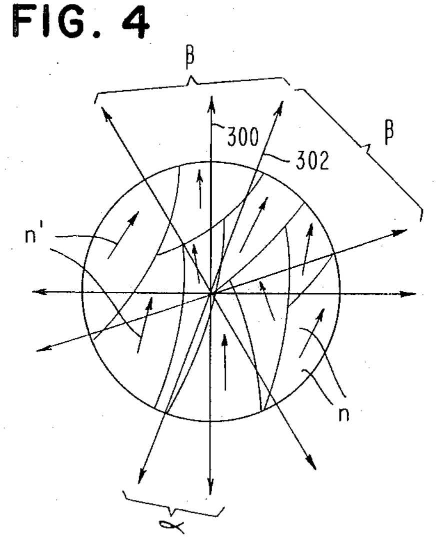
FIG. 4 is a schematic representation of the microscopic variance of the magnetization vector from the intended easy direction of magnetization to illustrate skew and dispersion.
Figure 5:
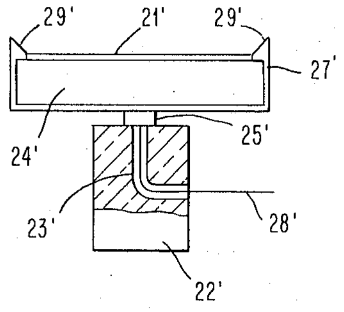
FIG. 5 is a schematic illustration of the clip used to bias the film condensing on a nonmetallic substrate.

$\beta$: dispersion is conveniently defined with reference to FIG. 5 which shows a section of a magnetic thin film, as comprising the aggregate of microscopic magnetic regions $n$. Associated with each of the microscopic magnetic regions $n$ is a magnetization vector $n'$. Under ideal conditions, each of the magnetization vectors $n'$, related to a microscopic magnetic region $n$, is parallel one to the other with the vector summation thereof yielding the intended easy direction of magnetization depicted as arrow 300. But, owing to various imperfections and fabrication difficulties, some of which are hereafter discussed, the intended easy direction of magnetization, arrow 300, is not achieved. The mathematical mean for the magnetization vectors $n'$ gives rise to a mean easy direction of magnetization designated arrow 302, and the angle $\alpha$, between the intended easy direction, arrow 300, and the mean easy direction, arrow 302, is commonly referred to as skew. Now, the angle in which we find 90% of the microscopic magnetization vectors $n'$ of the microscopic magnetic regions $n$ is dispersion, and that angle is graphically illustrated in FIG. 4 as the angle between the mean easy axis, arrow 302, and the boundary line, arrow 304, which includes 90% of the deviations of the magnetization vector $n'$ from the intended easy axis of magnetization arrow 300. Measurement of dispersion is similar to that discussed in the article by T. S. Crowther, entitled "Techniques for Measuring the Angular Dispersion of the Easy Axis of Magnetic Film," Group Report #51–2, M.I.T. Lincoln Lab, Lexington, Massachusetts (1959).

Figure 1:
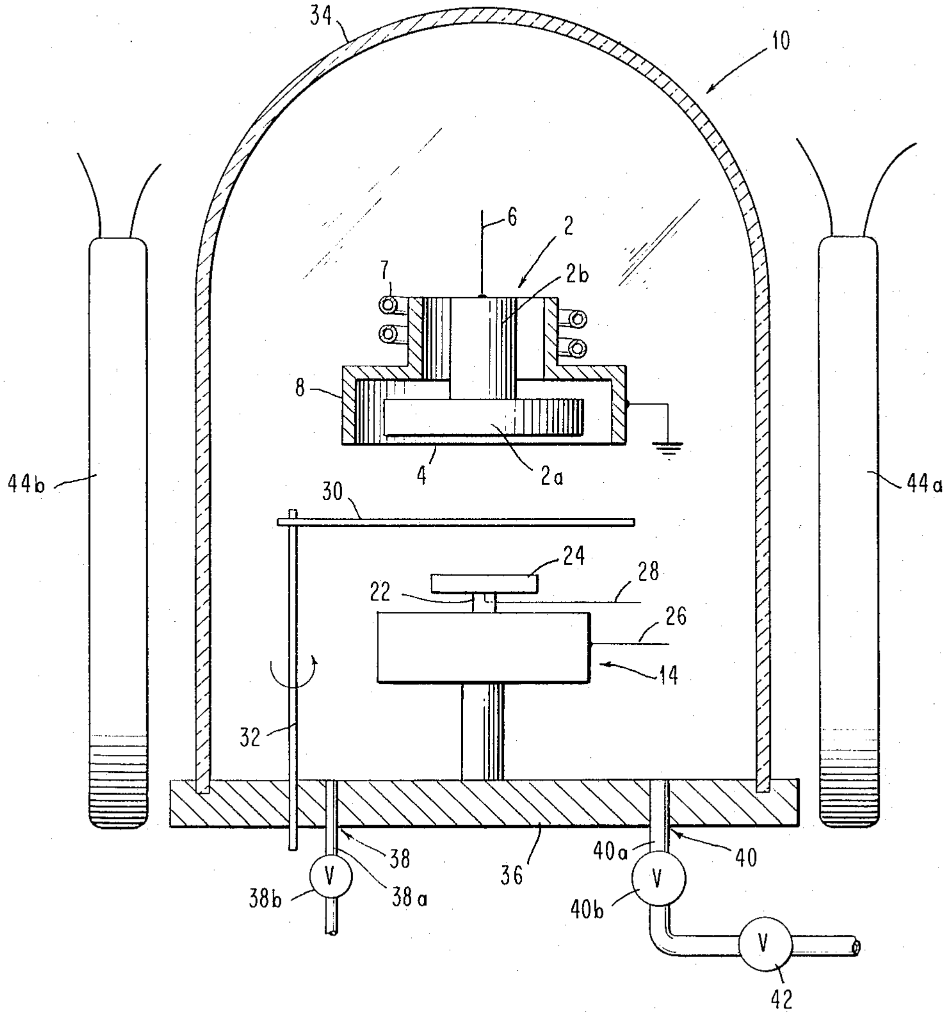
FIG. 1 is a schematic representation of the cathode sputtering apparatus utilized in the preparation of a magnetic thin film.

Now, speaking generally as to the conditions heretofore described, regarding the cathode sputtering of a ferromagnetic thin film, reference is made to FIG. 1, for convenience, which schematically illustrates the general type of apparatus, depicted as numeral 10, utilized in the practice of the invention. Apparatus 10 includes a first electrode 2, the cathode assembly, formed to also function as a heat sink, in that the lower portion 2*a* is added to the mass of the upper portion 2*b*. Rapid withdrawal of thermal energy from the face of the electrode is facilitated by the high conductivity of 2*a* and 2*b* and the large radiating surface dissipating heat to the cooling shield 8, hereafter described. Bonded to the surface of cathode assembly 2 is a thin foil of ferromagnetic material 4, the target. Coupled to the cathode assembly 2 is the negative lead 6 of a voltage source (not shown). A shield 8, having cooling coils 7 about its periphery, is positioned around cathtode assembly 2, within the Crookes dark space distance from the cathode. The Crookes dark space is a well known term in the art and is described in "Vacuum Deposition of Thin Films" by L. Holland, pp. 80–82 (1961 ed.).

Figure 6:
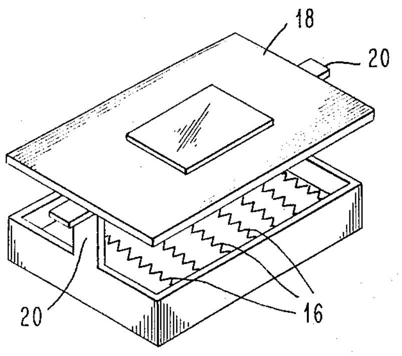
FIG. 6 is a schematic illustration of the anode assembly of FIG. 1.

Below cathode assembly 2 is placed, in substantially parallel spaced relation thereto, anode assembly 14, the schematic of which is shown in FIG. 6, including heating coils 16 for providing a uniform temperature profile on carrier portion 18 which is held by flanges 20. On the surface of the anode carrier portion 18 is support 22, which is preferably glass, which serves to prevent substrate 24 from making contact with the anode. In the particular apparatus utilized, a spacing of 2.5 centimeters is maintained between cathode and substrate, but any convenient spacing is permissible, providing it is maintained at a distance greater than the dark space distance. Anode assembly 14 is grounded via a lead 26 while the film that condenses on substrate 24 is biased as required via lead 28 coupled to the support 22.

Positioned between cathode assembly 2 and anode assembly 14 is rotatable shutter 30 which is placed between cathode 2 and anode 14 during the presputtering cleaning of the cathode. This is done to assure the removal of all contaminants from the surface of the ferromagnetic target. Once the precleaning step is performed, shaft 32 rotates shutter 30 away from its station between cathode 2 and anode assembly 14 to leave the ferromagnetic target 4 facing anode assembly 14.

Enclosing the electrodes is bell jar 34 which, in the particular arrangement, has a diameter of about 18 inches. Bell jar 34 rests on base member 36 which contains two ports 38 and 40. The first port 38 is an inlet for a suitable gas via conduit **38*a* and control valve 38*b*. Argon, for example, furnishes the necessary ionized particles for bombarding the surface of the ferromagnetic foil. The second port 40 serves to connect a second conduit 40*a* which, in turn, is controlled by a valve 40*b*, and, is coupled to a vacuum pump 42. It is usual to maintain the environment within the bell jar at a pressure in the range between $10^{-1}$ to $10^{-2}$ torr. Two coils 44*a* and 44*b* are mounted externally in bell jar 34** to provide a uniform magnetic field in the vicinity of the glow discharge, the coils being arranged to induce a magnetic field parallel at the surface of the substrate. To maintain a uniform field over the substrate surface requires relatively large coils.

By way of example, a vacuum melted and rolled 12.5 centimeter square 79 Ni–17 Fe–4 Mo sheet is bonded to the surface of the cathode assembly 2 and the vacuum system pumped down to less than $1\times10^{-6}$ torr. Substrate 24 is mounted on a support 22. Desirable materials for substrates are metals such as silver, copper, aluminum, or the like, or a nonmetallic, such as glass. Where metal is used as the substrate, lead 28 for biasing the film need only make contact with the bottom surface of the metal substrate. But, where a nonmetallic such as glass is the substrate, a clip is used as depicted in FIG. 5, lead 28' is passed through apertures 23' provided in glass support 22' and coupled to the base 25' of clip 27' which encases the bottom and side surfaces of the glass substrate. The elbows 29 of clip 27' contact the periphery of the surface upon which the sputtered material condenses. In those instances where it is desired to maintain a continuous bias on the film during the sputtering process, a land 21', which is a thin line of metal of the same composition as the target, is predeposited on the surface of the substrate by any of the conventional techniques. Clip 27' is then coupled to the predeposited land to provide a conductive path over the substrate surface. As hereafter explained, the bias to the film is most effective after a continuous layer of sputtered material collects on the surface of the substrate. The continuous layer then serves as a conductive path to the clip 27', and dispenses with the need for predeposited land 21'. The substrate is not clamped to support since this introduces stresses in the sputtered deposit, and stressing the film affects the uniformity of the magnetic properties. The bias clip, heretofore described, is mounted about the substrate to avoid the introduction of stresses in the device area of the film.

To provide the bombardment media for ejecting the atoms from the target, which in the example given was of a twenty mil thickness, argon is injected through port 38 to a pressure of approximately 0.1 torr, through conduit **38*a* and the regulation thereof maintained by valve 38*b*. With shutter 30 interposed between the cathode 2 and substrate 24, target 4 is cleaned by pre-sputtering, as discussed above, to remove contaminants from the surface thereof. Following the cathode cleanup, shaft 32 rotates shutter 30 from the intermediate position between target 4 and substrate 24. Thereafter a potential of about 2000 volts, for example, is applied between the cathode and an anode at a current of about 110 milliamperes. Once the glow discharge is initiated, a bias of about 100 volts is applied to the substrate by way of lead 28 and a magnetic field of about 25 oersteds is applied by way of coils 44*a* and 44*b*** to induce the magnetic anisotropy in the desired direction in the sputtered material. The sputtering is conducted for 110 seconds to produe a film with a thickness of about 700 Angstroms.

Figure 7:
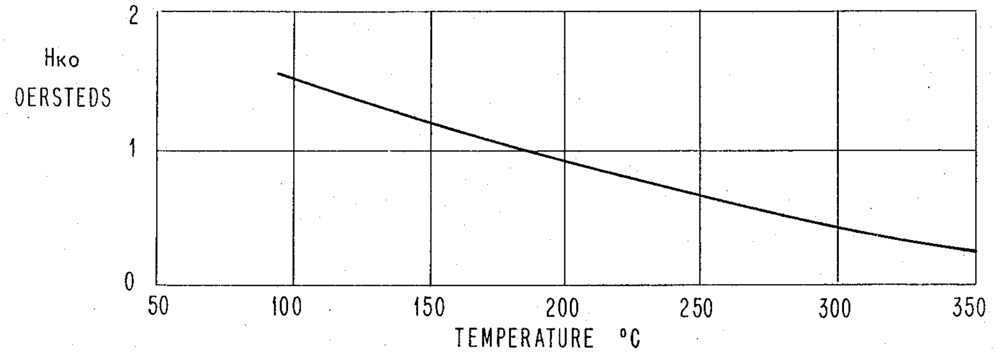
FIG. 7 is a plot of anisotropy ($H_{ko}$) in oersteds versus temperature in ° C.
Figure 8:
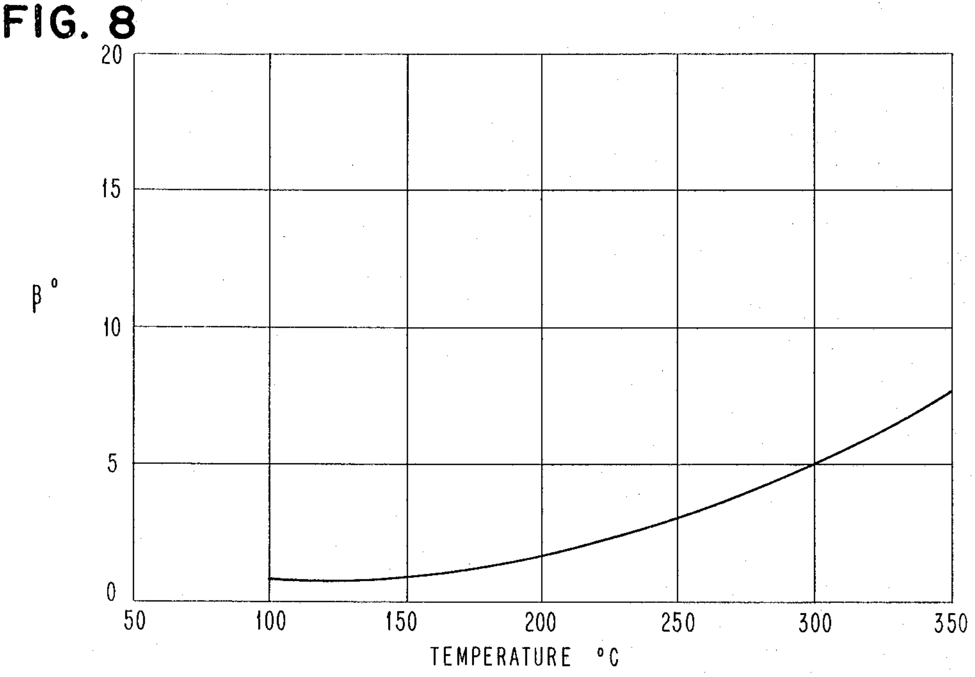
FIG. 8 is a plot of dispersion $\beta$ in degrees versus temperature in ° C.
Figure 9:
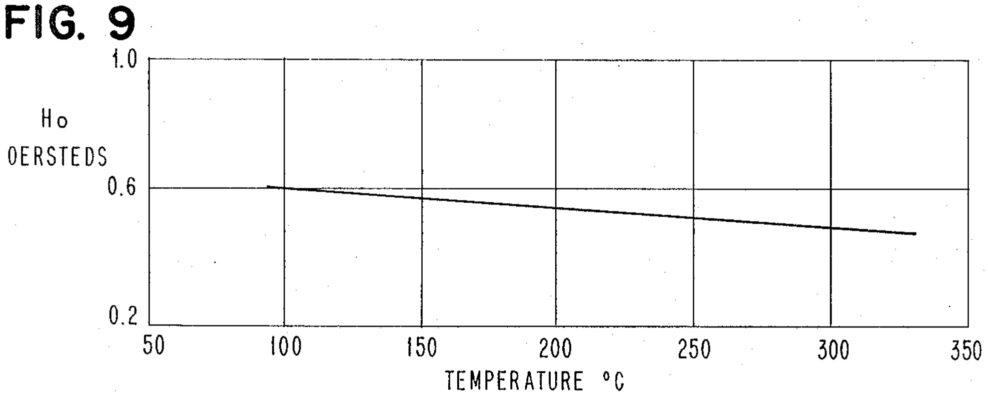
FIG. 9 is a plot of coercivity ($H_o$) in oersteds versus temperature in ° C.

Heating of substrate 24, upon which the ejected atoms from target 4 collect to form the ferromagnetic thin film, is important. In order to obtain the desired magnetostriction, coercive force $H_o$, anisotropy field $H_{ko}$ and dispersion $\beta$ in a ferromagnetic thin film of nickel-iron-molybdenum, the temperature gradient over the surface of substrate 24 must be minimized, and, more desirably, the profile thereof, maintained uniform. The affect of substrate temperature upon the magnetic properties is illustrated by FIGS. 7, 8 and 9 which are hereafter explained.

A ferromagnetic thin film containing 79% by weight nickel, about 17% by weight iron, and about 4% by weight molybdenum, and grown to a thickness of about 700 Angstroms, exhibited an anisotropy filed of about 0.5 oersted, a coercive force of about 0.4 oersted, and a dispersion within 5°. There is no upper limit to the thickness of the film available from the process, in accordance with the present invention, save that where demagnetizing fields would begin to have deleterious effects on the film, in the particular application for which it is employed. However, for computer applications, it is desirable to maintain the thickness of the film below 3000 Angstroms and preferably between 700 to 1000 Angstroms. Electron micrographs of the 700 Angstrom thick films taken by the direct replica technique at 54,000× show a grain size between 200 to 600 Angstroms with an average grain size of about 400 Angstroms, a grain being defined as the spherical elevation in the electron micrograph.

Ferromagnetic thin films containing molybdenum up to 6% by weight, with a nickel to iron ratio of about 4:1, are derived from the cathode sputtering process of the present invention. Ferromagnetic thin films containing from about 2% to 6% by weight molybdenum, 14% to 19% by weight iron, with the balance nickel, are preferable, and optimum magnetic properties are available with a ferromagnetic thin film of the composition 79% by weight nickel, 17% by weight iron and 4% by weight molybdenum. The ferromagnetic thin film alloys, in accordance with the invention, are produced with the anisotropy fields, coercive force, and dispersion as heretofore discussed, and with essentially zero magnetostriction. Similarly, electron micrographs indicate that the grain size for these nickel-iron-molybdenum films is between 200 and 600 Angstroms and do not reveal a preferred grain direction.

The electron micrographs, heretofore briefly mentioned, were taken by a direct replica technique. In that technique a carbon film was deposited over the surface of a ferromagnetic thin film. The carbon coated thin film was then immersed in a solution of hydrochloric acid and the ferromagnetic film etched away to leave the carbon replica thereof. The electron micrograph measurements were taken from the replica at a magnification of 54,000×.

Figure 2:
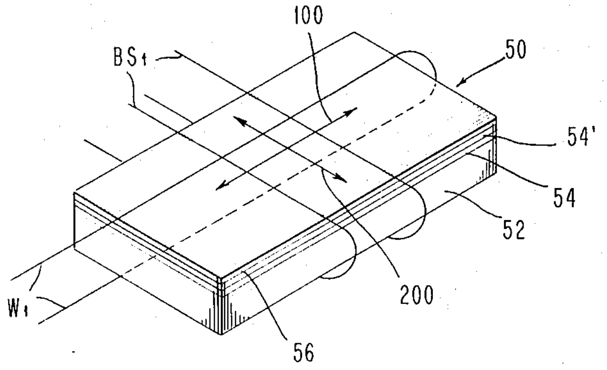
FIG. 2 is a schematic representation of a storage bit cell.

A magnetic thin film formed by the processes heretofore defined forms part of a storage matrix and one bit cell for such a matrix is shown in FIG. 2. Usually a series of these bit cells, generally depicted as numeral 50, are arranged in rows and columns with their associated conductors, that is, the word lines $W_1$ and the common-bit sense lines $BS_1$ disposed in such a manner that the conductors are substantially in quadrature one to the other. Bit cell 50 includes a base portion 52, which may be glass, mica, metal or the like. Where metal is used, it serves also as the ground return for the lines $W_1$ and $BS_1$, thereby attaining closer inductive coupling to the device. Other base 52 layer 54 of chromium and layer 54 of silicon monoxide are deposited. The multiple layers of both chromium and silicon oxide are used to reduce the surface roughness and increase adhesion. The ferromagnetic film 56 is placed over layer 54; drive lines $W_1$ and $BS_1$ complete the device. Arrow 100 in the device represents the easy direction of magnetization which is parallel to the drive line $W_1$, while arrow 200 represents the hard axis with the drive lines $BS_1$ being parallel, or in other words, transverse to arrow. Bit cell 50 is word organized with the word lines $W_1$, upon activation, furnishing a field transverse to the easy direction of magnetization of sufficient magnitude to rotate the magnetization 90° from the easy axis, while bit sense line $BS_1$, upon activation, produces a field parallel to the easy axis 100.

For purposes of discussion, to illustrate the operation of the cell 50, assume that the remanent magnetization representing data is oriented along the direction of arrow 100. With a field along the drive line $W_1$, the magnetization vector rotates away from the easy axis arrow 100 toward the hard axis arrow 200. Upon activation of the drive line $BS_1$, depending upon the polarity of the applied field (note that the bit line is activated before and deactivated after the word pulse) the magnetization vector falls either toward 100′ or 100″; the state assumed upon cessation of the word pulse determines the polarity of the intelligence to be stored, that is, in binary nomenclature whether a binary 1 or a binary 0 is stored. Sensing of this stored information is achieved with activation of the drive line $W_1$ during the rise time of the word pulse.

Figure 3:
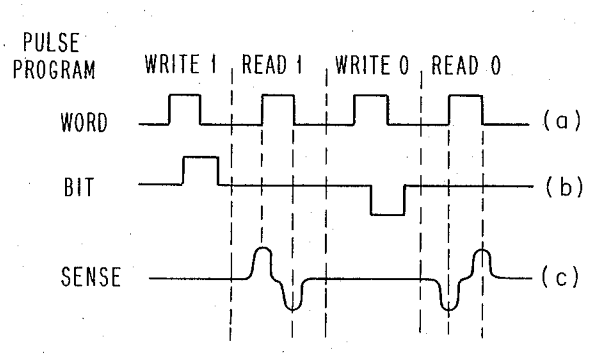
FIG. 3 is a typical pulse program utilized in the operation of the storage device of FIG. 2.

FIG. 3 depicts a typical pulse program for energizing the drive line $W_1$ and $BS_1$, a discussion of which may lend to the understanding of the operation of bit cell 50. To store a binary 1, first a pulse of positive polarity is applied along the drive line $W_1$, driving the stored intelligence toward the arrow 200. Were information previously stored in the bit cell, a sense amplifier (not shown) coupled to the common-bit sense line $BS_1$ would detect a signal such as that indicated under FIG. 3*c*. Following the activation of the word line with a field of approximately 3 $H_k$ (oersteds), drive line $BS_1$ is activated, having a field strength of about 0.5 $H_0$ (oersted), the time sequence for the activation of the pulses of both the word and bit drive lines illustrated in FIGS. 3*a* and 3*b*. With a positive pulse along line $BS_1$, the magnetization vector rotates toward 200″, thereby storing a binary 1. Were a binary 0 desired, the drive line is activated, with a positive polarity as heretofore descrbed, but, the polarity of the field induced along the bit drive line $BS_1$ is opposite to that of the polarity induced for the storage of the 1 resulting in the magnetization vector resting along at 200′. The requirements of the bit pulses are that they are large enough to assure complete rotation either to the right or left of 200 but small enough not to disturb intelligence stored along adjacent bits. The word pulse program requires that the applied fields are large enough to drive all bits toward 200 which represents the hard direction of magnetization. In principle there is no upper limit to its magnitude.

Other modes of operating a storage device are available, as described in the copending patent application of Bruce I. Bertelsen et al., Serial No. 334,858, filed December 31, 1963, and assigned to the assignee of the instant application. Operation of this device is based on device 50 having two additional quasistable magnetization positions in a direction orthogonal to arrow 100. In FIG. 2, as previously, arrow 100 represents the easy axis, but now positions 200′ and 200″ of arrow 200, the hard axis of magnetization, are utilized as additional quasistable states. The stability of these positions, which is initially unstable, is brought about by mutual locking of the magnetization subzones into which the film decomposes after the magnetic field pulse has ended.

To operate the device with four stable states, the word pulse is activated with the appropriate field strength to rotate the magnetization vector from the easy axis toward the hard axis. Depending upon the polarity of the applied word pulse, the magnetization vector assumes either position 200′ or 200″. To rotate the stored information from the hard axis, arrow 200, to a position along arrow 100, activation of both the word $W_1$ and bit lines $BS_1$ is required. Reading is performed in a similar manner, as heretofore described, for the conventional mode; the output signals are sensed upon the leading edge of the applied word pulse, with the polarity of the sensed signal depicting the intelligence stored.

The manner in which the bias is applied to the ferromagnetic film during formation depends on the substrate material upon which the ejected target atoms are collected. In those instances where nonmetallic substrates are employed, activation of the bias to the film during the entire period of collection of the ejected atoms is acceptable. But, in those instances where the ferromagnetic thin films are cathodically deposited on metallic substrates, substantially covered with a nonmetallic such as silicon monoxide or the like, the period of delay prior to the activation of the bias to the film is required.

It is common to predeposit layers of silicon monoxide on the substrate surface since it has been found that the magnetic properties are greatly enhanced as a result of the underlayer of the silicon monoxide. The silicon monoxide, it is hypothesized, reduces surface roughness and serves as a diffusion barrier between the susbtrate and the film. Where increased adhesion is sought, alternate layers of chromium and silicon monoxide are predeposited such as illustrated by layers 54 and 54′ respectively of the device of FIG. 2 (see Silicon Monoxide Undercoating for Improvement of Magnetic Film Memory Characteristics, B. I. Bertelsen, Journal of Applied Physics, vol. 33, No. 6, pp. 2026–2030, June 1962). With a metallic substrate having a superimposed layer of a nonmetallic such as the silicon monoxide, continuous application of the bias to the collecting film result in contamination of the resulting deposit which depreciates the characteristics of the magnetic film. This is avoided by delaying the application of the bias to the substrate until the ferromagnetic target has undergone ionic bombardment for a predetermined period to permit the collection of a continuous layer over the substrate. The problem is not so much a question of the magnitude of the initial layer thickness to which the condensed film develops prior to activating the negative bias (with respect to the anode) but to withhold the application of the bias until the deposited layer provides a continuous conductive path over the surface of the substrate.

What has been described is a ferromagnetic thin film alloy containing up to 6% by weight molybdenum, with the balance being nickel and iron essentially in the ratio of 4:1, characterized by superior uniform magnetic properties including low anisotropy fields, low coercive force, essentially zero magnetostriction and other desirable properties for computer applications. Desirably, the ferromagnetic thin film alloy contains from about 2% to 6% by weight molybdenum, from about 14% to 19% by weight iron, with the balance nickel. Optimum magnetic characteristics are available with the ferromagnetic thin film that contains about 4% weight molybdenum with the balance of nickel and iron being approximately in the ratio of 4:1. The ferromagnetic thin films are the product of a cathode sputtering process in which process a bias is applied to the sputtered material as it collects on a substrate. Electro micrographs, of the direct replica type, taken at a magnification of 54,000×, show that these ferromagnetic thin films have a grain size between 200 to 600 Angstroms and do not reveal a preferred grain direction. As will be apparent to those skilled in the art, the illustrated arrangements for the apparatus can be readily modified without departing from the principles of the herein described invention. It will be readily appreciated that bombarding media other than argon are usable in the process in accordance with the present invention. For example, helium, neon, krypton, mercury and xenon are usable to provide the source of the bombarding ions.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A process for cathodically sputtering a ferromagnetic thin film containing up to 6% by weight molybdenum and the balance being nickel and iron, with a nickel to iron ratio of approximately 4:1, comprising the steps of:

positioning a target of said ferromagnetic material on the face of an electrode;

impressing a potential between said electrode and a second electrode, said second electrode being in approximately spaced relation to said first electrode such that said first electrode is at a negative potential with respect to said second electrode;

applying an electrical bias to the sputtered film which sputtered film collects on a substrate, said bias maintaining said film at a negative potential with respect to said second electrode but at a positive potential with respect to said first electrode; and simultaneously inducing a mangetic field substantially parallel at the surface of said substrate and through said sputtered material.

2. A process for cathodically sputtering a ferromagnetic thin film alloy containing between 2% to 6% by weight molybdenum, between 14% to 17% by weight iron, with the balance nickel, where said sputtered ferromagnetic thin film alloy is characterized by superior uniform magnetic properties including an anisotropy field of up to about 0.5 oersted, and a coercive force of about 0.5 oersted, said process comprising the steps of:

providing two electrodes in approximately spaced relation one to the other where said electrodes are in an enclosure;

positioning on the face of one electrode a target of said ferromagnetic material, placing about the face of said second electrode, the anode, a substrate;

reducing the pressure about said first and second electrodes;

injecting a source of gaseous material between said target and said anode;

applying a potential between said target and said anode such that said target is at a negative potential with respect to said anode while applying an electrical bias, which bias is negative with respect to said anode but positive with respect to said target, to the sputtered film collecting on said substrate; and simultaneously inducing a magnetic field substantially parallel at the surface of said substrate and through said sputtered material.

3. A process for cathodically sputtering a ferromagnetic thin film containing from about 2% to 6% by weight molybdenum, from about 14% to 19% by weight iron with the balance nickel, where said ferromagnetic thin film alloy is characterized by superior uniform properties, an anisotropy field of up to about 0.5 oersted and a coercive force of about 0.5 oersted, comprising the steps of:

providing two electrodes in approximate parallel spaced relation one to the other in an enclosure;

mounting on the face of one electrode a target of said ferromagnetic material;

placing in proximity to the face of said second electrode, the anode, a substrate, where said substrate is spaced from the face of said anode by way of a support;

reducing the pressure about said first and second electrodes to a predetermined level;

injecting a source of gaseous mtaerial between said first and second electrodes; and, applying a potential between said target and said anode while applying an electrical bias to the sputtered film, collecting on the substrate, to maintain said sputtered film at a negative potential with respect to the anode but at a positive potential with respect to said target while simultaneously inducing a magnetic field substantially parallel at the surface of said substrate and through said sputtered material, the application of said potential between said target and said anode causing the gaseous material to bombard the target and sputter atoms therefrom, which atoms collect on the substrate thereby forming the ferromagnetic thin film alloy.

References Cited by the Examiner

UNITED STATES PATENTS

| | | | |
|---|---|---|---|
| 3,021,271 | 2/1962 | Wehner | 204—192 |
| 3,077,444 | 2/1963 | Hoh | 204—192 |
| 3,117,065 | 1/1964 | Wootten | 204—20 |
| 3,160,576 | 12/1964 | Lauf | 204—192 |
| 3,161,946 | 12/1964 | Berkenbeil | 204—192 |

References Cited by the Applicant

K. Y. Ahn and W. R. Beam: Journal of Applied Physics, vol. 33, No. 2, Pt. II, March 1964, pp. 832–833.

JOHN H. MACK, *Primary Examiner.*

R. MIHALEK, *Assistant Examiner.*